US009585099B1

(12) United States Patent
Manchanda et al.

(10) Patent No.: US 9,585,099 B1
(45) Date of Patent: Feb. 28, 2017

(54) CONTROLLING CARRIER FREQUENCY SCANNING BASED ON BATTERY LIFE AND COMPARISON OF CARRIER FREQUENCIES

(71) Applicant: Sprint Spectrum L.P., Overland Park, KS (US)

(72) Inventors: Nitesh Manchanda, Overland Park, KS (US); Sreekar Marupaduga, Overland Park, KS (US); Vanil Parihar, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/053,027

(22) Filed: Feb. 25, 2016

(51) Int. Cl.
| | |
|---|---|
| *H04M 1/00* | (2006.01) |
| *H04W 52/02* | (2009.01) |
| *H04W 72/04* | (2009.01) |
| *H04W 36/36* | (2009.01) |
| *H04W 88/02* | (2009.01) |

(52) U.S. Cl.
CPC ....... *H04W 52/0261* (2013.01); *H04W 36/36* (2013.01); *H04W 72/0453* (2013.01); *H04W 72/0473* (2013.01); *H04W 88/02* (2013.01)

(58) Field of Classification Search
CPC ......... H04W 52/0261; H04W 72/0453; H04W 72/0473; H04W 36/36; H04W 88/02

USPC .......... 455/574, 434, 435.1–435.2, 436–442, 455/161.1; 370/331
See application file for complete search history.

(56) References Cited

U.S. PATENT DOCUMENTS

| | | | | |
|---|---|---|---|---|
| 2007/0135122 | A1* | 6/2007 | Dillon | H04W 36/30 455/433 |
| 2007/0280164 | A1* | 12/2007 | Hayashi | H04W 72/048 370/331 |
| 2014/0286309 | A1* | 9/2014 | Lau | H04L 43/16 370/331 |

* cited by examiner

Primary Examiner — Wayne Cai

(57) ABSTRACT

Disclosed are methods and systems to help conserve battery life of a user equipment device (UE). In particular, the UE may make a determination that a remaining battery life is threshold low. In response to making the determination, the UE may engage in a scanning-limiting process that involves (i) the UE identifying on the list each carrier frequency higher than the serving carrier frequency and (ii) based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. Further, once the UE detects the trigger, the UE may responsively scan carrier frequencies in accordance with the scanning-limiting process.

20 Claims, 5 Drawing Sheets

CONTROLLING CARRIER FREQUENCY SCANNING BASED ON BATTERY LIFE AND COMPARISON OF CARRIER FREQUENCIES

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of UEs, initiation of communications, handoff between coverage areas, and other functions related to air interface communication.

In accordance with the air interface protocol, each base station (and thus each coverage area) may operate on at least one carrier frequency (could also be referred to herein as a "carrier") for carrying communications wirelessly between the base station and UEs. In particular, the air interface between the base station and UEs may carry communications on one or more particular frequency channels, each defining one or more ranges of radio frequency spectrum within a particular frequency band (or "band class" (BC)). As such, the carrier of a base station may be considered to be the one or more frequency channels on which the base station operates and/or the one or more frequency bands in which the base station operates. Furthermore, a coverage area may operate using a frequency division duplex (FDD) arrangement defining different ranges of frequency being used for the downlink than for the uplink or may operate using a time division duplex (TDD) arrangement defining the same range of frequency being used for the downlink and uplink and being allocated over time among downlink and uplink communications. In an FDD arrangement, an FDD carrier may therefore include a pair of frequency channels with a first channel being used for downlink communication and a second channel being used for uplink communication. Whereas, in a TDD arrangement, a TDD carrier may therefore include a single frequency channel divided over time into segments for downlink communication and other segments for uplink communication.

Moreover, the industry defines various frequency bands each made up of one or more frequency channels. In accordance with industry regulations or engineering design, some of those bands define frequency channels for FDD use (with pairs of those channels defining FDD carriers) and other ones of those bands define frequency channels for TDD use (with each channel defining a TDD carrier). Also in accordance with industry regulations or engineering design, the frequency channels defined in these bands may vary in bandwidth based on the bands in which they are defined and may thus support different speeds of data communication. By way of example, for LTE service, the industry currently defines BC-25 (at or around 1900 MHz) and BC-26 (at or around 800 MHz) for FDD communication, and the frequency channels provided in these bands may span 5 MHz in each direction, thus supporting up to about 25 Mbps on the downlink. In addition, the industry currently defines BC-41 for TDD communication, and the frequency channels provided in BC-41 may be 20 MHz wide, thus supporting up to about 60 Mbps on the downlink. Other examples are also possible.

Further, the coverage area provided by each base station may define various logical or physical channels (e.g., through frequency division multiplexing, time division multiplexing, orthogonal frequency division multiplexing, and/or code division multiplexing) for carrying certain types of communications between the base station and UEs. By way of example, on the downlink, the coverage area may define a reference channel for carrying a reference signal that UEs can monitor as a way to detect and evaluate coverage of the base station, one or more control channels for carrying various system information and control messages to UEs, and one or more traffic channels such as a shared downlink channel for carrying bearer communication traffic and other data to UEs. And on the uplink, the coverage area may similarly define one or more control channels for carrying control messages to the base station, and one or more traffic channels such as a shared channel for carrying bearer communication traffic and other data to the base station.

When a UE is being served by a base station on a particular carrier ("serving carrier"), the UE may monitor signal strength (e.g., signal-to-noise ratio) of reference signals received from the serving base station, and the UE may apply various thresholds to control carrier frequency scanning and possible resulting handover to another carrier frequency (e.g., provided by the same serving base station or by another base station). For example, an air interface protocol may define a start-scanning threshold for serving-carrier signal strength, such that when the UE detects that the signal strength on the serving carrier is lower than the start-scanning threshold, the UE starts to scan for coverage on one or more other carriers. Further, an air interface protocol may define a handover threshold for serving-carrier signal strength (e.g., equal to or lower than the start-scanning threshold), such that when the UE finds coverage on at least one target carrier and detects that the signal strength on the serving carrier is lower than the handover threshold, the UE begins engaging in signaling with its serving base station to possibly trigger handover of the UE to that target carrier.

In practice, the signaling that the UE engages in to possibly trigger handover may take one of various forms. In some cases, the UE may transmit to its serving base station a measurement report that specifies the coverage detected on one or more carriers and, for each such detected coverage, the detected signal strength. The serving base station and/or associated network infrastructure may then decide based on the UE's measurement report to process a handover of the UE to a particular target carrier from which the UE detected sufficiently strong signal strength. In other cases, the UE may engage in signaling with its serving base station to simply request handover to a detected target carrier and the base station may respond to the request by engaging in handover signaling with other network entities and/or with the UE so as to carry out the handover.

Furthermore, an air interface protocol may sometimes also define yet another threshold that, together with the handover threshold, may possibly trigger handover of the UE to a target carrier. In particular, an air interface protocol may define a target carrier threshold for target-carrier signal strength, such that when the UE detects that the signal strength on the serving carrier is lower than the handover threshold and also detects that the signal strength on the target carrier is higher than the target carrier threshold, the UE begins engaging in signaling with its serving base station to possibly trigger handover of the UE to that target carrier. In this manner, in order to possibly trigger handover of the UE to a target carrier, the UE would need to detect serving-carrier signal strength at least as low as the handover threshold and target-carrier signal strength at least as high as the target carrier threshold. Other thresholds are possible as well.

OVERVIEW

When a UE starts to scan for coverage on one or more carriers, the UE may refer to a list of carriers so as to determine the specific carriers to scan. In practice, one or more of the carriers on the list may be higher in frequency than the UE's serving carrier and/or one or more of the carriers on the list may be lower in frequency than the UE's serving carrier. Moreover, the list may include priority information specifying a priority level respectively for each listed carrier, the priority level defining a priority of the UE being served on the carrier. In this manner, the UE may scan listed carriers, some of which could be lower in frequency than the serving carrier and/or some of which could be higher in frequency than the serving carrier. And once the UE finds coverage on at least one target carrier that is of higher priority than the serving carrier and also detects serving signal strength at least as low as the handover threshold (and perhaps also detects target-carrier signal strength at least as high as the target carrier threshold), the UE may engage in signaling with its serving base station to possibly trigger handover of the UE to that target carrier.

Generally, a UE may be powered by a battery and therefore may have a limited extent of battery energy to use to carry out various operations. And when the UE carries out operations related to scanning and to signaling with the UE's serving base station, those operations could consume some of that limited battery energy. In particular, in order to engage in the scanning and/or the signaling, the UE may use a radio frequency (RF) transceiver, which consumes some battery energy during its operation. And the more scanning and/or signaling that is carried out by the UE, the more battery energy that RF transceiver may consume.

Additionally, higher frequency carriers generally have higher path loss than lower frequency carriers and thus, assuming all other factors are the same, a UE may consume more battery energy when operating on a higher frequency carrier than when operating on a lower frequency carrier. In particular, due to the higher path loss, a UE may detect lower signal strength on higher frequency carriers than on lower frequency carriers. As a result, operating on higher frequency carriers rather than on lower frequency carriers may increase the likelihood of the serving-carrier signal strength falling below one or more of the above-mentioned thresholds, which may then cause the UE to engage in scanning and/or signaling and thus to consume battery energy. Moreover, due to the higher path loss, the UE may use higher transmission power when signaling on higher frequency carriers than when signaling on lower frequency carries, thereby consuming more battery energy when signaling on higher frequency carriers than when signaling on lower frequency carries.

Given that various operations could consume some of the UE's limited battery energy, at issue then is how to conserve a UE's remaining battery life in light of these various operations. As such, disclosed herein are methods and systems to help conserve the remaining battery life.

In accordance with the disclosure, a UE having a battery may make a determination that the UE's remaining battery life is threshold low and may respond to making the determination by determining that, when scanning carrier frequencies in search of target coverage, the UE should exclude from its scanning any carrier frequencies higher than the UE's serving carrier frequency. Consequently, once the UE detects a trigger to scan carrier frequencies in search of target coverage for possible handover (e.g., once a detected reference signal strength falls below the start-scanning threshold), the UE may respond to the trigger by scanning each carrier frequency lower than the serving carrier frequency and perhaps also the serving carrier frequency itself. In this way, the UE may forgo the scanning of carrier frequencies higher than the serving carrier frequency yet may still scan carrier frequencies lower than the serving carrier frequency.

In practice, the disclosed approach may help the UE conserve its remaining battery life in various ways. For instance, avoiding scanning on carrier frequencies higher than the serving carrier frequency may reduce the number of carrier frequencies being scanned and thus the extent of scanning carried out by the UE, which may ultimately help conserve the remaining battery life of the UE. Moreover, avoiding scanning on carrier frequencies higher than the serving carrier frequency may avoid having the UE transition to operating on such a higher carrier frequency and thus may avoid the more battery intensive scanning and/or signaling that could result from operation on that higher carrier frequency as discussed above.

Accordingly, in one respect, disclosed is a method operable in a UE that has a battery and is being served on a serving carrier frequency by a base station over an air interface connection between the UE and the base station. The UE in the method is configured with a list of carrier frequencies (e.g., after the UE receives the list from the base station and/or via manual engineering input) that includes at least one carrier frequency lower than the serving carrier frequency and at least one carrier frequency higher than the serving carrier frequency and is configured to scan each of the carrier frequencies on the list in search of target coverage for possible handover from the serving carrier frequency.

In accordance with the method, the UE may make a determination that a remaining battery life of the battery is threshold low. In response to making the determination, the UE may engage in a scanning-limiting process. The scanning-limiting process may involve the UE identifying on the list each carrier frequency higher than the serving carrier frequency. Additionally, the scanning-limiting processes may involve, based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. Furthermore, the UE may detect the trigger to scan carrier frequencies in search of target coverage for possible handover and, in response to detecting the trigger, may scan carrier frequencies in accordance with the scanning-limiting process.

In another respect, disclosed is a UE including a battery, one or more processors, a data storage, and program instructions stored on the data storage and executable by the one or more processors to carry out operations while the UE is being served on a serving carrier frequency by a base station over an air interface connection between the UE and the base station. Further, the UE is configured with a list of carrier frequencies that includes at least one carrier frequency lower than the serving carrier frequency and at least one carrier frequency higher than the serving carrier frequency and is configured to scan each of the carrier frequencies on the list in search of target coverage for possible handover from the serving carrier frequency.

In this arrangement, the operations may involve making a determination that a remaining battery life of the battery is threshold low. Further, the operations may involve, in response to making the determination, engaging in a scanning-limiting process. The scanning-limiting process may involve the UE identifying on the list each carrier frequency higher than the serving carrier frequency. Additionally, the scanning-limiting processes may involve, based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. Furthermore, the operations may involve detecting the trigger to scan carrier frequencies in search of target coverage for possible handover. And, the operations may involve, in response to detecting the trigger, scanning carrier frequencies in accordance with the scanning-limiting process.

In another respect, disclosed is another method also operable in a UE that has a battery and is being served on a serving carrier frequency by a base station over an air interface connection between the UE and the base station. Here again, the UE is configured with a list of carrier frequencies that includes at least one carrier frequency lower than the serving carrier frequency and at least one carrier frequency higher than the serving carrier frequency and is configured to scan each of the carrier frequencies on the list in search of target coverage for possible handover from the serving carrier frequency.

In accordance with this method, the UE may make a determination of whether or not a remaining battery life of the battery is threshold low. If the determination is that the remaining battery life is threshold low, then, responsive to making the determination, the UE may engage in a scanning-limiting process. The scanning-limiting process may involve the UE identifying on the list each carrier frequency higher than the serving carrier frequency. Additionally, the scanning-limiting processes may involve, based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. But if the determination is that the remaining battery life is not threshold low, then, responsive to making the determination, the UE may determine that the UE should, when scanning carrier frequencies in search of target coverage for possible handover, scan all of the carrier frequencies on the list including the at least one carrier frequency higher than the serving carrier frequency. In turn, once the UE detects a trigger to scan carrier frequencies in search of target coverage for possible handover the UE may response to detecting the trigger by scanning carrier frequencies in accordance with the determination.

Still further, in another respect, disclosed is a non-transitory computer-readable medium having stored thereon instructions executable by a processor to cause a UE to carry out functions such as those noted above, to facilitate control of carrier frequency scanning based on remaining battery life and based on comparison of frequencies.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
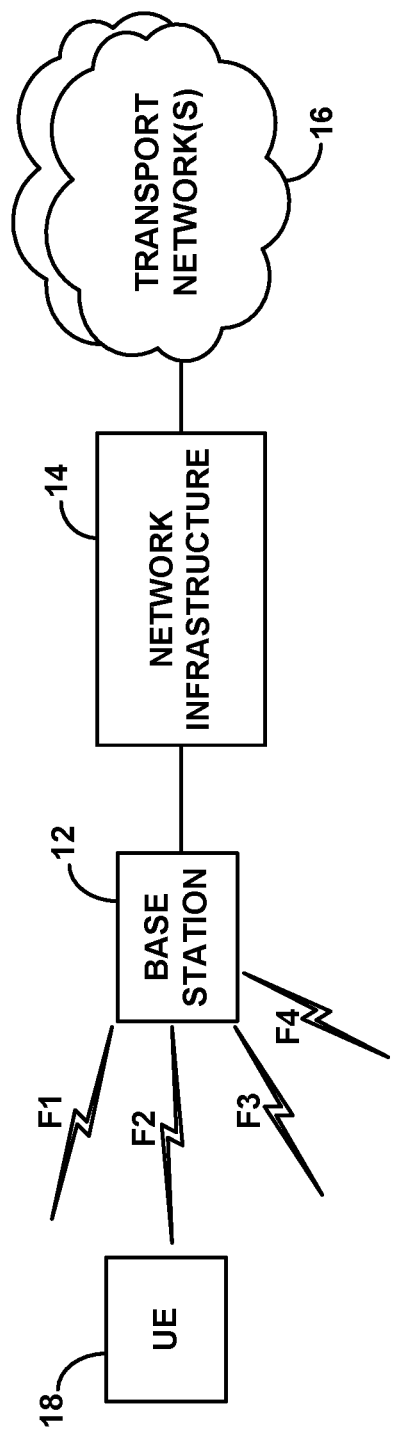
FIG. 1 is a simplified block diagram of an example communication system in which aspects of the present disclosure can be implemented.

The present disclosure will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example network arrangement including a base station operating on carrier frequencies. In particular, the example arrangement includes a base station 12 operating on carrier frequencies F1, F2, F3, and F4. For purposes of this description, the terms "F1", "F2", "F3", and "F4" are merely labels designating the carrier frequencies of the illustrated base station and should not be viewed as limiting. Further, although the base station is shown as operating on four carrier frequencies, in practice a representative base station might be arranged to operate on any number of carrier frequencies.

In the example arrangement of FIG. 1, base station 12 is shown as communicatively linked with common network infrastructure 14. In practice, network infrastructure 14 could be a network controller and/or an aggregation point, which may also function to provide or facilitate connectivity with one or more transport networks 16 such as the PSTN or a packet-switched network. Alternatively, the network infrastructure 14 could take other forms and serve other purposes or could be provided specifically for purposes of facilitating some of the features discussed herein.

In addition, shown as being served by base station 12 on carrier frequency F2 is a representative UE 18. When the base station 12 serves the UE 18, the base station 12 may do so over a radio resource control (RRC) connection defining a radio-link-layer connection between the UE 18 and the base station 12. As such, we may assume that the UE 18 has worked with base station 12 to establish the RRC connection, and that at least one logical bearer has been established between the UE 18 and the network infrastructure 14. Furthermore, the UE 18 may be arranged to be able to operate on any of various carrier frequencies. For instance, the UE 18 may be a multi-band device, including one or more radios and associated components for being served on various frequency bands. In a specific example, the UE 18 may be a quad-band device arranged to support operation on four different frequency bands. Other examples are also possible.

Further, the base station 12 may be arranged to broadcast a system information message that specifies one or more thresholds for use by UEs being served by the base station 12, so as to control when the UEs would begin carrier frequency scanning and when the UEs would engage in signaling for possible handover. By way of example, these thresholds may include the start-scanning, handover, and/or target carrier thresholds described above, among other thresholds. In an LTE network, for instance, the start-scanning threshold for the serving reference signal strength is known as the "A2" threshold, the handover threshold for the serving reference signal strength is known as the "$A5_1$" threshold, and the target carrier threshold for the target reference signal strength is known as the "$A5_2$" threshold. Additionally, LTE defines an "A1" threshold for serving-carrier signal strength, such that when a UE detects that the signal strength on the serving carrier is higher than the A1 threshold, the UE may stop scanning for coverage.

Consequently, when the UE 18 is served by the base station 12 (e.g., when the UE starts being served by the base station 12), the UE 18 may programmatically receive and read the system information message broadcasted by the base station 12, so as to determine the thresholds that the UE 18 should apply, and the UE 18 may then apply those determined thresholds. For instance, in an LTE network, the UE 18 may receive from its serving base station 12 a system information message that specifies the A2, $A5_1$, $A5_2$, and/or A1 thresholds, and the UE 18 may then apply those thresholds while served by the base station 12, to determine when to start carrier frequency scanning and when to engage in signaling for possible handover, among other possibilities.

Further, as noted, when the UE 18 detects a trigger to start scanning (e.g., when the UE 18 detects serving-carrier signal strength below the A2 threshold) and then responsively starts to scan for coverage on one or more carrier frequencies, the UE 18 may refer to a list of carrier frequencies so as to determine the specific carrier frequencies to scan. In practice, the UE 18 may obtain the list from its serving base station 12 and perhaps may store the obtained list on its data storage. Moreover, the UE 18 may obtain the list from its serving base station 12 at any time, such as when the base station 12 starts to serve the UE 18, among other possibilities. In this way (or through manual engineering input), the UE 18 may be configured with the list.

Figure 2:
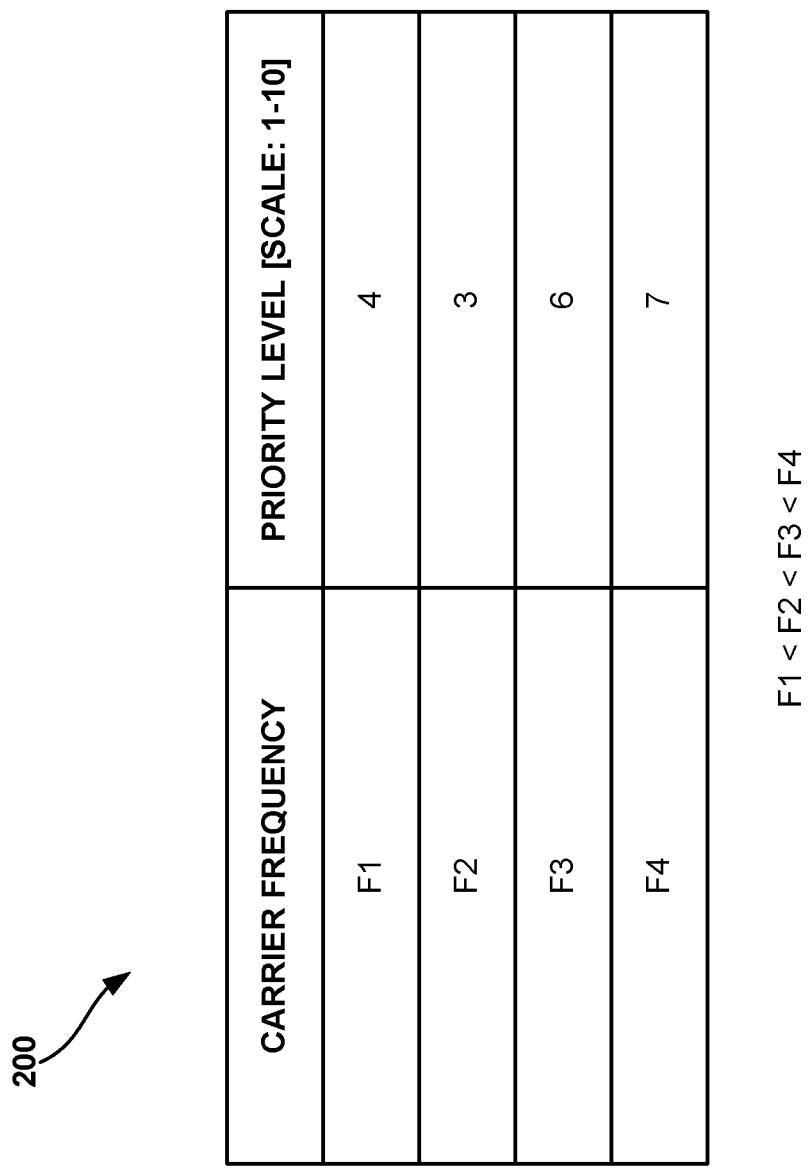
FIG. 2 shows a list of carrier frequencies and priority levels of those carrier frequencies, in accordance with an example embodiment.

FIG. 2 shows an example scan list 200 that the UE 18 may refer to so as to determine specific carrier frequencies to scan. In particular, FIG. 2 illustrates that the scan list 200 includes the above-mentioned carrier frequencies F1, F2, F3, and F4 and, for sake of example only, that carrier frequency F1 is lower in frequency than the serving carrier frequency F2 of the UE 18, that carrier frequency F3 is higher in frequency than the serving carrier frequency F2, and that carrier frequency F4 is higher in frequency than the serving carrier frequency F3. Additionally, FIG. 2 illustrates that carrier frequency F1 has a priority level of four on a scale of one to ten, that carrier frequency F2 has a priority level of three on the scale of one to ten, that carrier frequency F3 has a priority level of six on the scale of one to ten, and that carrier frequency F4 has a priority level of seven on the scale of one to ten. With this arrangement, if the UE 18 were to find coverage on a carrier frequency (e.g., F3) that is of higher priority than its serving carrier frequency (e.g., F2), then the UE 18 or the base station 12 may ultimately trigger handover of the UE 18 to that higher priority carrier frequency. Moreover, these priority levels may be included as part of the obtained list or may be obtained in other ways. Other examples are possible as well.

As discussed above, the UE 18 may be powered by a battery and may carry out operations related to scanning and/or to signaling with its serving base station 12, which may consume some of the UE 18's limited extent of battery energy. In practice, battery consumption resulting from these operations may be especially problematic at times when the UE 18 has a remaining battery life that is threshold low. As such, the present disclosure provides for control of carrier frequency scanning based on remaining battery life and based on comparison of frequencies, so as to conserve the remaining battery life.

In accordance with the disclosure, the UE 18 may be configured to make a determination (e.g., continuously or periodically) of whether or not the UE's remaining battery life is threshold low. In particular, the UE may determine its remaining battery life in various ways using techniques currently known or using techniques developed in the future. For instance, the UE 18 may have a battery level sensor, which could be integrated in the UE's battery or could be provided in another form. In practice, the battery level sensor may be configured to monitor the remaining battery life and to provide an output signal indicating the UE's current remaining battery life, which could be represented as a remaining voltage of the battery, as a remaining percentage of the battery's energy capacity, and/or as a remaining time until the battery is depleted of stored energy, among other options. As such, a processor of the UE 18 may receive the output signal and may determine based on the signal whether or not the current remaining battery life (e.g., twenty minutes until the battery is depleted) is below a threshold remaining battery life (e.g., thirty minutes until the battery is depleted). Other instances are possible as well.

After the UE 18 makes the determination of whether or not the remaining battery life is threshold low, the UE may then responsively take steps in accordance with the determination to determine which carrier frequencies are to be scanned by the UE as part of any upcoming and/or future carrier frequency scanning. According to the present disclosure, if the determination is that the remaining battery life is threshold low, then the UE 18 may responsively determine that the UE 18 should not scan any listed carrier frequencies that are higher than the UE's serving carrier frequency but should still scan listed carrier frequencies other than those higher carrier frequencies. Whereas, if the determination is that the remaining battery life is not threshold low, then the UE 18 may responsively determine that the UE 18 should scan all of the listed carrier frequencies.

In particular, if the UE determines that the remaining battery life is not threshold low, then the UE may responsively determine that the UE should scan all of the carrier frequencies on the list, including carrier frequencies higher than the serving carrier frequency as well as carrier frequencies lower than the serving carrier frequency and perhaps also the serving carrier frequency itself. For instance, the UE 18 may determine that the UE 18 should scan all of the carrier frequencies F1, F2, F3, and F4 listed in the scan list 200. In this way, once the UE 18 detects a trigger to carry out carrier frequency scanning, the UE 18 may responsively scan all of the carrier frequencies on the list and perhaps may do so in an order that is based on the specified priority levels.

On the other hand, if the UE 18 determines that the remaining battery life is threshold low, then the UE 18 may responsively engage in a scanning-limiting process. The scanning-limiting process may involve the UE 18 identifying on the scan list each carrier frequency that is higher than the serving carrier frequency. For instance, the UE 18 may carry out a comparison between various carrier frequencies listed on the scan list 200 and, based on that comparison, may identify that carrier frequencies F3 and F4 are both higher than the serving carrier frequency F2. And once the UE 18 identifies the higher carrier frequencies, the scanning-limiting process may then involve the UE 18 excluding from the list each of those identified higher carrier frequencies and doing so despite one or more such higher carrier frequencies potentially being of higher priority compared to the serving carrier frequency. For instance, the UE 18 may determine that the UE 18 should exclude the carrier frequencies F3 and F4 from its scan list 200 and do so despite carrier frequencies F3 and F4 both having priority levels higher than that of serving carrier frequency F2.

In practice, the UE 18 may carry out one of various operations in order to exclude higher carrier frequencies from the list. In one case, the UE 18 may modify the list to produce a modified list that does not include each of the identified higher carrier frequencies yet still includes each carrier frequency that is lower than the serving carrier frequency. In another case, the UE 18 may simply add to the list an indication (e.g., by adding meta-data) indicating that the UE 18 should forgo scanning of the identified higher carrier frequencies. In yet another case, the UE 18 may simply set a flag (e.g., a Boolean variable) to indicate that the UE 18 should not scan higher carrier frequencies. In either case, once the UE 18 excludes higher carrier frequencies from the list and detects the above-mentioned trigger, the UE 18 may scan each carrier frequency on the list that is lower than the serving carrier frequency and perhaps may also scan the serving carrier frequency itself, but may forgo scanning each higher carrier frequency. Other cases are also possible.

In some arrangements, the scanning-limiting process may specifically occur in situations when the UE 18 has a threshold low remaining battery life and also encounters a trigger to scan. In particular, the UE 18 could be arranged to carry out the scanning-limiting process in response to both a determination that the remaining battery life is threshold low and a detection of the above-mentioned trigger. In this way, the UE 18 may not carry out the above-described exclusion operations every time that the UE 18 makes the determination of the remaining battery life being threshold low. Rather, the UE 18 may carry out the exclusion operations only when the UE 18 has a threshold low remaining battery life and also actually needs to carry out carrier frequency scanning. As such, the exclusion operations do not necessarily need to involve the act of modifying the list in some way and may instead be a more dynamic part of the overall scanning process, by arranging the UE 18 (e.g., by setting the above-mentioned flag) to simply not scan each higher carrier frequency but to still scan each carrier frequency lower than the serving carrier frequency. Other arrangements are possible as well.

When the UE 18 excludes from its scanning each carrier frequency that is identified as being higher than the UE's serving carrier frequency, the UE 18 could end up transitioning to being served on another carrier frequency that is lower in frequency than the serving carrier frequency, or the UE 18 could end up continuing to be served on the serving carrier frequency. In particular, if the UE 18 finds coverage on another carrier frequency that is lower in frequency than the serving carrier frequency and is of higher priority compared to the serving carrier frequency, then the UE 18 may responsively engage in signaling with its serving base station 12 to possibly result in hand over to that other carrier frequency. Whereas, if the UE 18 does not find coverage on any lower carrier frequency that is of higher priority compared to the serving carrier frequency, then the UE 18 may simply not transition to another carrier frequency and may thus continue being served on its serving carrier frequency.

Furthermore, after the UE 18 excludes from its scanning each higher carrier frequency, the UE 18 may determine at a later point time that the remaining battery life is no longer threshold low, such as after the battery has been charged for instance, and the UE 18 may responsively again take steps to determine carrier frequencies that should be scanned during upcoming and/or future carrier frequency scanning. In particular, if the UE 18 determines that the remaining battery life is no longer threshold low, then the UE 18 may responsively determine that the UE 18 should scan all of the carrier frequencies on the list. In some cases, the determination that the UE 18 should scan all of the carrier frequencies on the list may involve the UE 18 further modifying the list by including in the list each of the previously identified higher carrier frequencies. And in other cases, that determination may involve the UE modifying the list by removing the indication indicating that the UE 18 should forgo scanning of the identified higher carrier frequencies. And in yet other cases, that determination may involve the UE 18 removing the above-mentioned flag (e.g., changing or removing the Boolean variable). In either case, once the UE 18 further modifies the list and again encounters the above-mentioned trigger, the UE 18 may then responsively scan all of the carrier frequencies on the list including those higher than the serving carrier frequency.

In practice, a UE that carries out the disclosed approach may end up conserving its remaining battery life when its remaining battery life is threshold low. More specifically, by avoiding scanning of carrier frequencies higher than the serving carrier frequency, the UE may reduce the number carrier frequencies being scanned and may thus conserve battery life due to a likely reduction in the overall extent of scanning being carried out. Moreover, by avoiding scanning of carrier frequencies higher than the serving carrier frequency, the UE may avoid transitioning to being served on such a higher carrier frequency, thereby avoiding the more battery intensive scanning and/or signaling that could occur on grounds of that higher carrier frequency having higher path loss as discussed above.

Figure 3:
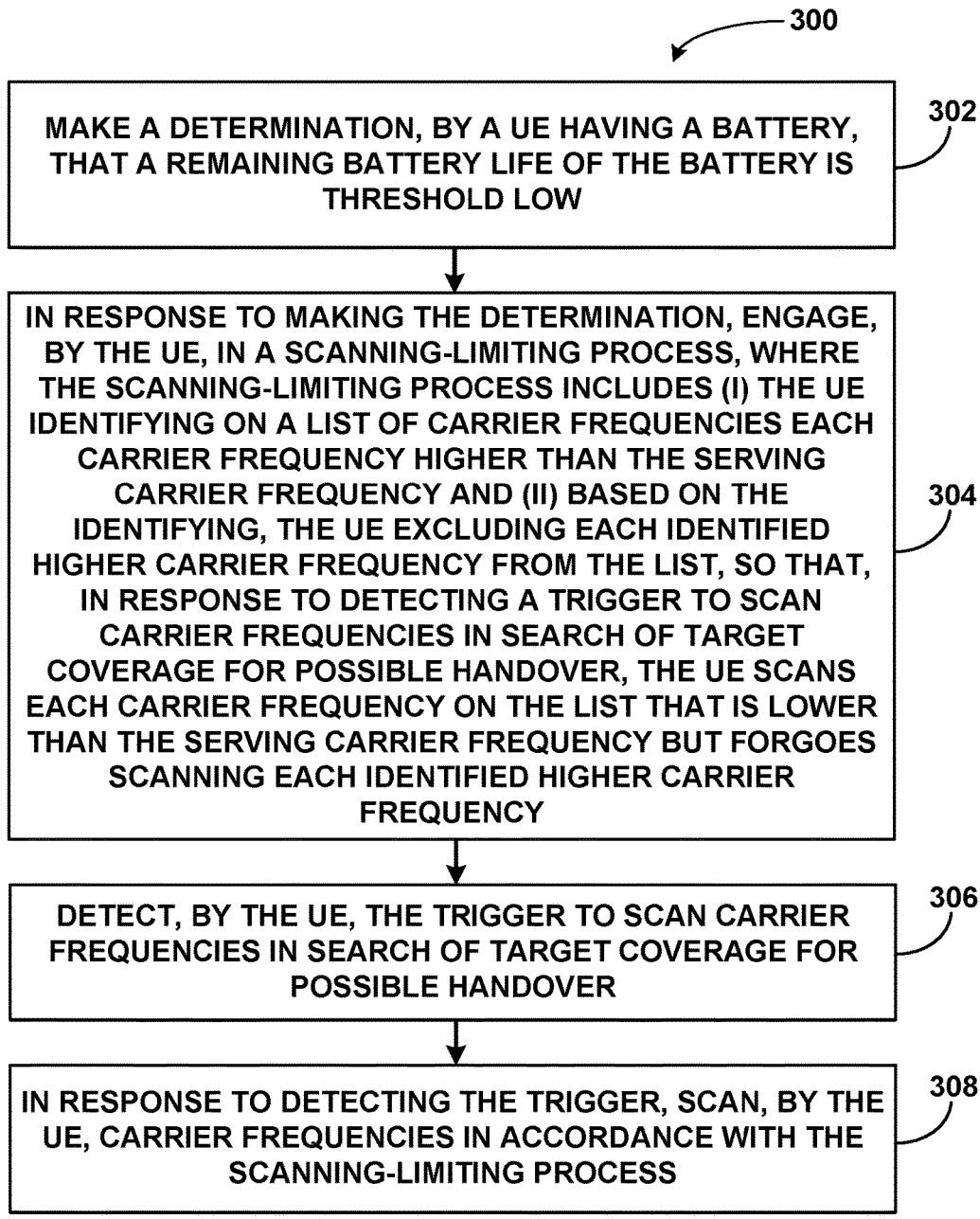
FIG. 3 is a flowchart illustrating a method to facilitate control of carrier frequency scanning, in accordance with an example embodiment.

FIG. 3 is next a flow chart illustrating a method 300 according to an example embodiment. Illustrative methods, such as method 300, may be carried out in whole or in part by component(s) and/or arrangement(s) in a wireless communication system, such as with one or more of the components of the example UE shown in FIG. 5 and further discussed below, among other possibilities. However, it should be understood that example methods, such as method 300, may be carried out by other entities or combinations of entities as well as in other arrangements, without departing from the scope of the disclosure.

In particular, method 300 is operable in a UE that has a battery and is being served on a serving carrier frequency by a base station over an air interface connection between the UE and the base station. The UE is configured with a list of carrier frequencies that includes at least one carrier frequency lower than the serving carrier frequency and at least one carrier frequency higher than the serving carrier frequency and is configured to scan each of the carrier frequencies on the list in search of target coverage for possible handover from the serving carrier frequency.

As shown by block 302 in FIG. 3, method 300 involves the UE making a determination that a remaining battery life of the battery is threshold low. At block 304, method 300 then involves, in response to making the determination, the UE engaging in a scanning-limiting process. The scanning-limiting process may involve the UE identifying on the list each carrier frequency higher than the serving carrier frequency. Additionally, the scanning-limiting process may involve, based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. Further, at block 306, method 300 then involves the UE detecting the trigger to scan carrier frequencies in search of target coverage for possible handover. And at block 308, method 300 then involves, in response to detecting the trigger, the UE scanning carrier frequencies in accordance with the scanning-limiting process.

Figure 4:
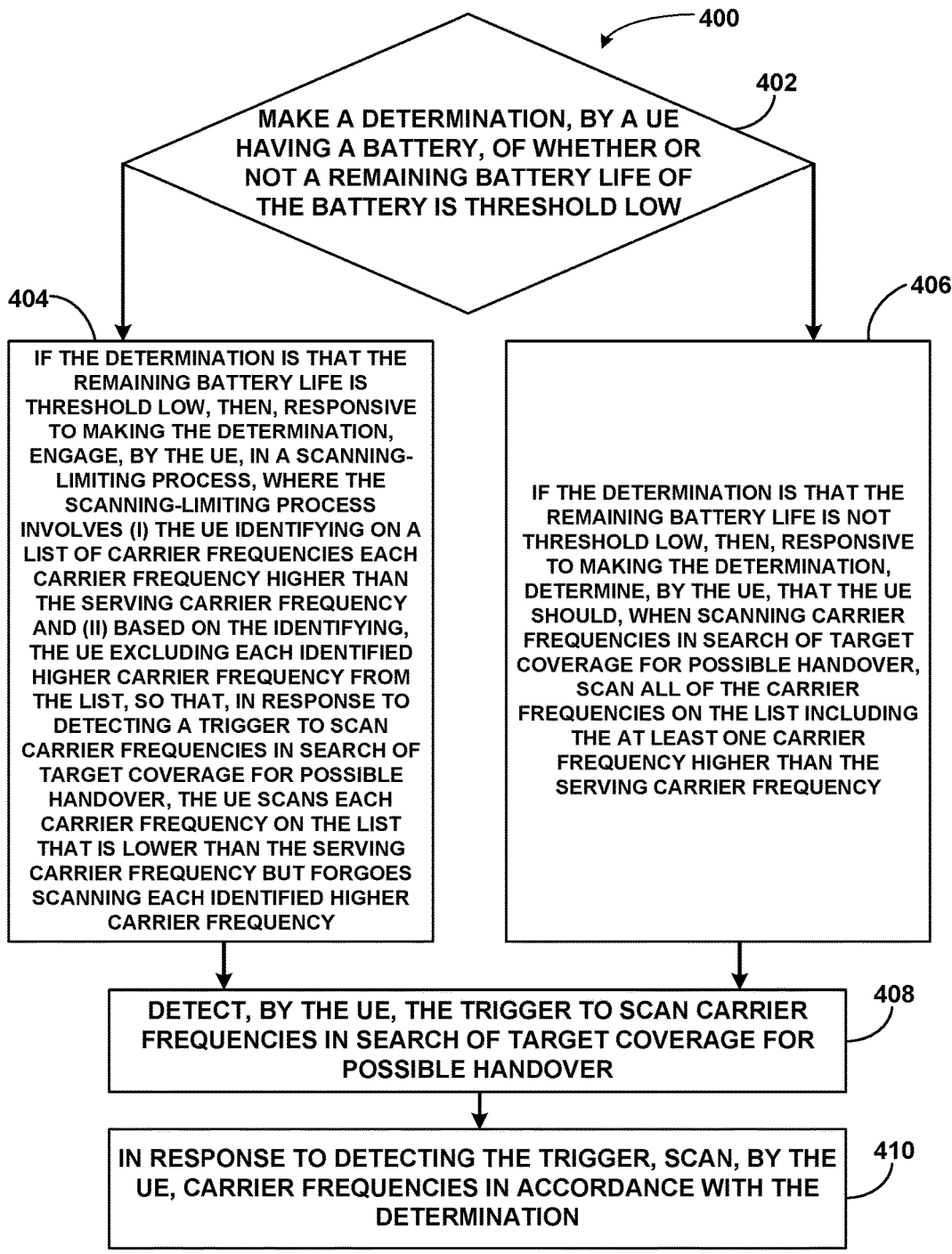
FIG. 4 is a flowchart illustrating another method to facilitate control of carrier frequency scanning, in accordance with an example embodiment.

FIG. 4 is next a flow chart illustrating a method 400 that is also operable in a UE that has a battery and is being served on a serving carrier frequency by a base station over an air interface connection between the UE and the base station. Here again, the UE is configured with a list of carrier frequencies that includes at least one carrier frequency lower than the serving carrier frequency and at least one carrier frequency higher than the serving carrier frequency and is configured to scan each of the carrier frequencies on the list in search of target coverage for possible handover from the serving carrier frequency.

Accordingly, as shown by block 402 in FIG. 4, method 400 involves the UE making a determination of whether or not a remaining battery life of the battery is threshold low. At block 404, method 400 involves, if the determination is that the remaining battery life is threshold low, then, responsive to making the determination, the UE engaging in a scanning-limiting process. The scanning-limiting process may involve the UE identifying on the list each carrier frequency higher than the serving carrier frequency. Additionally, the scanning-limiting process may involve, based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency. Further, at block 406, method 400 involves, if the determination is that the remaining battery life is not threshold low, then, responsive to making the determination, the UE determining that the UE should, when scanning carrier frequencies in search of target coverage for possible handover, scan all of the carrier frequencies on the list including the at least one carrier frequency higher than the serving carrier frequency. Yet further, at block 408, method 400 then involves the UE detecting the trigger to scan carrier frequencies in search of target coverage for possible handover. And at block 410, method 400 then involves, in response to detecting the trigger, the UE scanning carrier frequencies in accordance with the determination.

Figure 5:
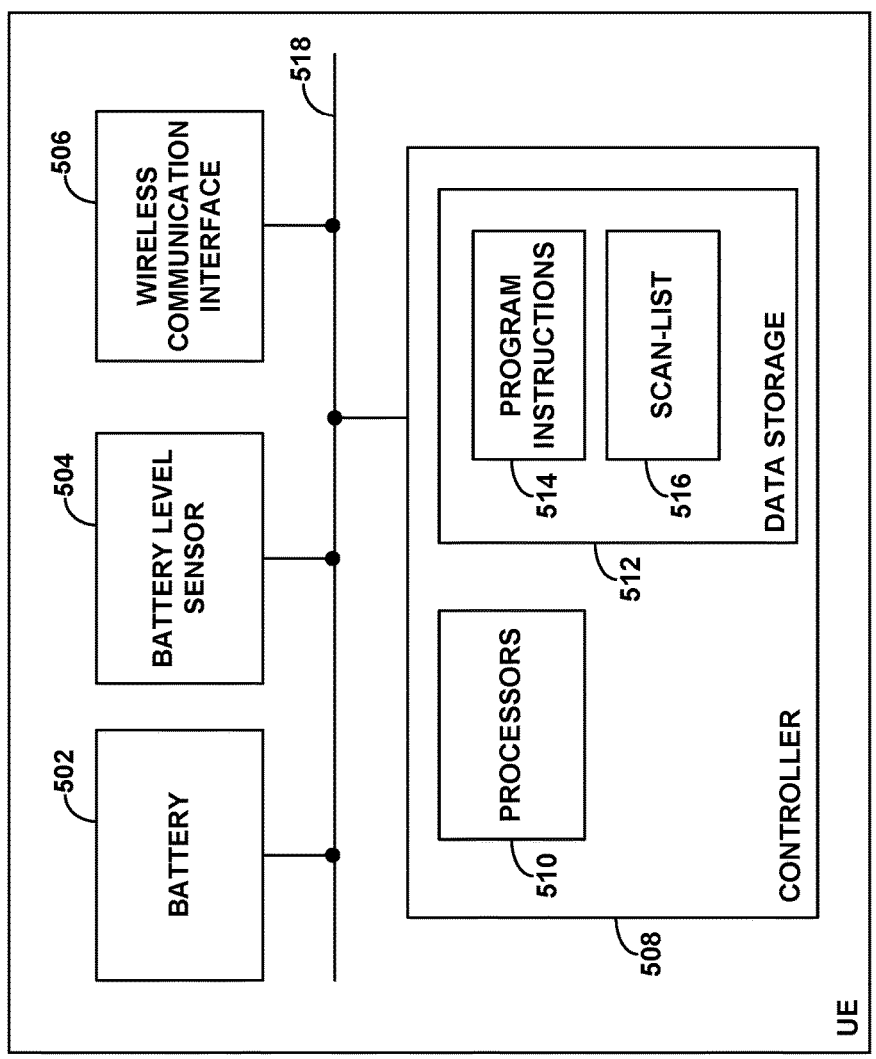
FIG. 5 is a simplified block diagram of a UE operable in accordance with the present disclosure.

FIG. 5 is next a simplified block diagram of an example UE, showing some of the components that can be included in such a UE. As shown in FIG. 5, the example UE includes a battery 502, a battery level sensor 504, a wireless communication interface 506, and a controller 508, all of which may reside within or on a housing and be integrated or communicatively linked together by a system bus, network, or other connection mechanism 518.

Battery 502 may be configured to provide energy to support operation of the example UE when the example UE is not connected with another energy source. In practice, battery 502 is preferably rechargeable, although the present disclosure could also be carried out in the context of a non-rechargeable battery. Moreover, the battery 502 may take various forms, examples of which include nickel metal hydride (NiMH), nickel cadmium (NiCd), Lithium Ion (Li-Ion), and lithium polymer (Li-Poly), or any other form currently known or developed in the future. Furthermore, battery level sensor 504 functions to regularly monitor the remaining power of battery 502 and to provide an output signal indicating the current remaining battery power. In some implementations, the battery level sensor 504 may be integrated in the battery 502 itself or could be provided in some other form.

Wireless communication interface 506 is configured to allow the example UE to engage in wireless communication over the air interface with a base station. In particular, the wireless communication interface 506 may include or be interconnected with one or more antenna structures each arranged to facilitate air interface communications. Also, the interface 506 may include a processing unit programmed with program instructions to facilitate communication in accordance with one or more communication protocols for instance.

Controller 508, which may effectively be part of the wireless communication interface 506 or may be provided separately, may then or therefore be configured to cause the example UE to carry out various UE operations, such as control of carrier frequency scanning for instance. As such, the controller 508 may take various forms. For instance, the controller 508 may be hard coded or provided as hardware such as an application specific integrated circuit or other structure (not shown). Alternatively or additionally (as shown), the controller 508 could be provided as one or more processors 510 (e.g. one or more microprocessors), data storage 512, and program instructions 514 stored in the data storage 512 and executable by the one or more processors 510 to carry out the various operations.

In particular, the one or more processors 510 may comprise one or more general purpose processors (e.g., microprocessors) and/or special-purpose processors (e.g., digital signal processors and/or application specific integrated circuits) and may be integrated in whole or in part with the wireless communication interface 506. And data storage 512 may include one or more volatile and/or non-volatile storage components, such as magnetic, optical, flash, or other types of non-transitory computer readable media, and may be integrated in whole or in part with the one or more processors 510.

As shown, data storage 512 may hold (e.g., have encoded thereon) program instructions 514, which may be executable by one or more processors 510 to carry out various controller functions. Additionally or alternatively, the data storage 512 may hold a scan-list 516 defining a list of carrier frequencies that the example UE may refer to when determining one or more carrier frequencies to scan.

Exemplary embodiments have been described above. It should be understood, however, that variations from these embodiments are possible, while remaining within the true spirit and scope of the invention.

We claim:

1. A method operable in a user equipment device (UE) that has a battery and is being served on a serving carrier frequency by a base station over an air interface connection between the UE and the base station, wherein the UE is configured (i) with a list of carrier frequencies that includes at least one carrier frequency lower than the serving carrier frequency and at least one carrier frequency higher than the serving carrier frequency and (ii) to scan each of the carrier frequencies on the list in search of target coverage for possible handover from the serving carrier frequency, the method comprising:
    making a determination, by the UE, that a remaining battery life of the battery is threshold low;
    in response to making the determination, engaging, by the UE, in a scanning-limiting process, wherein the scanning-limiting process comprises (i) the UE identifying on the list each carrier frequency higher than the serving carrier frequency and (ii) based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency;
    detecting, by the UE, the trigger to scan carrier frequencies in search of target coverage for possible handover; and
    in response to detecting the trigger, the UE scanning carrier frequencies in accordance with the scanning-limiting process.

2. The method of claim 1, wherein the UE comprises a data storage containing the list of carrier frequencies that the UE is configured to scan when in search of target coverage for possible handover.

3. The method of claim 1, wherein engaging in the scanning-limiting process is further in response to detecting the trigger.

4. The method of claim 1, wherein detecting the trigger comprises (i) receiving a reference signal from the base station, (ii) determining a signal strength level of the received reference signal, and (iii) determining that the determined signal strength level is below a threshold signal strength level.

5. The method of claim 1, wherein the serving carrier frequency is of a first priority level that indicates priority of the UE being served on the serving carrier frequency, wherein a particular one of the identified higher carrier frequencies is of a second priority level that indicates priority of the UE being served on the particular identified higher carrier frequency, and wherein the second priority level is higher than the first priority level.

6. The method of claim 5, wherein engaging in the scanning-limiting process comprises:
    excluding each identified higher carrier frequency from the list despite the second priority level being higher than the first priority level.

7. The method of claim 1, further comprising:
    after scanning carrier frequencies in accordance with the scanning-limiting process, making a further determination, by the UE, that the remaining battery life of the battery is no longer threshold low;
    in response to making the further determination, determining, by the UE, that the UE should, when scanning carrier frequencies in search of target coverage for possible handover, scan all of the carrier frequencies on the list including the at least one carrier frequency higher than the serving carrier frequency;
    detecting, by the UE, a further trigger to scan carrier frequencies in search of target coverage for possible handover; and
    in response to detecting the further trigger, scanning, by the UE, all of the carrier frequencies on the list including the at least one carrier frequency higher than the serving carrier frequency.

8. A user equipment device (UE) comprising:
    a battery;
    one or more processors;
    a data storage; and
    program instructions stored on the data storage and executable by the one or more processors to carry out operations while the UE is being served on a serving carrier frequency by a base station over an air interface connection between the UE and the base station, wherein the UE is configured (i) with a list of carrier frequencies that includes at least one carrier frequency lower than the serving carrier frequency and at least one carrier frequency higher than the serving carrier frequency and (ii) to scan each of the carrier frequencies on the list in search of target coverage for possible handover from the serving carrier frequency, the operations comprising:
    making a determination that a remaining battery life of the battery is threshold low;
    in response to making the determination, engaging in a scanning-limiting process, wherein the scanning-limiting process comprises (i) the UE identifying on the list each carrier frequency higher than the serving carrier frequency and (ii) based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency;
    detecting the trigger to scan carrier frequencies in search of target coverage for possible handover; and
    in response to detecting the trigger, scanning carrier frequencies in accordance with the scanning-limiting process.

9. The UE of claim 8, wherein the data storage contains the list of carrier frequencies that the UE is configured to scan when in search of target coverage for possible handover.

10. The UE of claim 8, wherein engaging in the scanning-limiting process is further in response to detecting the trigger.

11. The UE of claim 8, wherein detecting the trigger comprises (i) receiving a reference signal from the base station, (ii) determining a signal strength level of the received reference signal, and (iii) determining that the determined signal strength level is below a threshold signal strength level.

12. The UE of claim 8, wherein the serving carrier frequency is of a first priority level that indicates priority of the UE being served on the serving carrier frequency, wherein a particular one of the identified higher carrier frequencies is of a second priority level that indicates priority of the UE being served on the particular identified higher carrier frequency, and wherein the second priority level is higher than the first priority level.

13. The UE of claim 12, wherein engaging in the scanning-limiting process comprises:
excluding each identified higher carrier frequency from the list despite the second priority level being higher than the first priority level.

14. The UE of claim 8, wherein the operations further comprise:
after scanning carrier frequencies in accordance with the scanning-limiting process, making a further determination that the remaining battery life of the battery is no longer threshold low;
in response to making the further determination, determining that the UE should, when scanning carrier frequencies in search of target coverage for possible handover, scan all of the carrier frequencies on the list including the at least one carrier frequency higher than the serving carrier frequency;
detecting a further trigger to scan carrier frequencies in search of target coverage for possible handover; and
in response to detecting the further trigger, scanning all of the carrier frequencies on the list including the at least one carrier frequency higher than the serving carrier frequency.

15. A method operable in a user equipment device (UE) that has a battery and is being served on a serving carrier frequency by a base station over an air interface connection between the UE and the base station, wherein the UE is configured (i) with a list of carrier frequencies that includes at least one carrier frequency lower than the serving carrier frequency and at least one carrier frequency higher than the serving carrier frequency and (ii) to scan each of the carrier frequencies on the list in search of target coverage for possible handover from the serving carrier frequency, the method comprising:

making a determination, by the UE, of whether or not a remaining battery life of the battery is threshold low;
if the determination is that the remaining battery life is threshold low, then, responsive to making the determination, engaging, by the UE, in a scanning-limiting process, wherein the scanning-limiting process comprises (i) the UE identifying on the list each carrier frequency higher than the serving carrier frequency and (ii) based on the identifying, the UE excluding each identified higher carrier frequency from the list, so that, in response to detecting a trigger to scan carrier frequencies in search of target coverage for possible handover, the UE scans each carrier frequency on the list that is lower than the serving carrier frequency but forgoes scanning each identified higher carrier frequency;
if the determination is that the remaining battery life is not threshold low, then, responsive to making the determination, determining, by the UE, that the UE should, when scanning carrier frequencies in search of target coverage for possible handover, scan all of the carrier frequencies on the list including the at least one carrier frequency higher than the serving carrier frequency;
detecting, by the UE, the trigger to scan carrier frequencies in search of target coverage for possible handover; and
in response to detecting the trigger, scanning, by the UE, carrier frequencies in accordance with the determination.

16. The method of claim 15, wherein the UE comprises a data storage containing the list of carrier frequencies that the UE is configured to scan when in search of target coverage for possible handover.

17. The method of claim 15, wherein engaging in the scanning-limiting process is further in response to detecting the trigger.

18. The method of claim 15, wherein detecting the trigger comprises (i) receiving a reference signal from the base station, (ii) determining a signal strength level of the received reference signal, and (iii) determining that the determined signal strength level is below a threshold signal strength level.

19. The method of claim 15, wherein the serving carrier frequency is of a first priority level that indicates priority of the UE being served on the serving carrier frequency, wherein a particular one of the identified higher carrier frequencies is of a second priority level that indicates priority of the UE being served on the particular identified higher carrier frequency, and wherein the second priority level is higher than the first priority level.

20. The method of claim 19, wherein engaging in the scanning-limiting process comprises:
excluding each identified higher carrier frequency from the list despite the second priority level being higher than the first priority level.

* * * * *